UNITED STATES PATENT OFFICE 1,985,886

PROCESS FOR MAKING ACETYL BENZOYL PEROXIDE

Thomas F. Carruthers, South Charleston, W. Va., assignor to Carbide and Carbon Chemicals Corporation, a corporation of New York No Drawing. Application December 22, 1933, Serial No. 703,599

6 Claims. (Cl. 260—16)

This invention is an improved process for making acetyl benzoyl peroxide

The process broadly consists in oxidizing mixtures of benzaldehyde and acetic anhydride in the presence of certain catalysts or promoters, all as more fully hereinafter described.

Acetyl benzoyl peroxide is a highly unstable material, and for this reason it is valuable as an oxygen-producing substance. It is particularly useful as a catalyst in reactions designed to produce resinous or polymeric materials. For example, its use and advantages as a catalyst for the polymerization of vinyl compounds have been pointed out by L. C. Shriver in Patent 1,938,870, issued December 12, 1933.

It is known that acetyl benzoyl peroxide can be made by the oxidation of benzaldehyde-acetic anhydride mixtures according to the equation

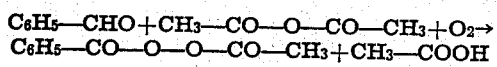

This reaction, however, is erratic, and, even when carried out using the purest of starting materials, it results in yields of the product which are too low for successful commercial production. These factors have made the commercial production of acetyl benzoyl peroxide by known methods difficult and expensive.

It is a principal object of this invention to provide an improved, efficient and economical process for making acetyl benzoyl peroxide in good yields. The advantages of the process of this invention will be apparent.

The invention may be practiced by employing oxygen, air, or other oxygen-containing gases to oxidize mixtures of benzaldehyde and acetic anhydride which contain a small quantity of dibenzoyl peroxide as a catalyst or promoter for the reaction. The quantity of dibenzoyl peroxide used may vary from about 0.25% to about 1.0% by weight of the total reaction mixture, and about 0.5% to about 0.75% is preferred. There is no reason to believe that amounts of dibenzoyl peroxide greater than 1% would be harmful in the process, but such amounts seem to be unnecessary. The function of dibenzoyl peroxide in the process is not understood, and this invention is in nowise restricted to any theory of its operation.

One very interesting feature of this invention is the fact that contrary to what might be expected from the action of dibenzoyl peroxide as a catalyst or promoter, the addition of previously prepared acetyl benzoyl peroxide to the reaction does not satisfactorily catalize or promote it as does dibenzoyl peroxide.

By the use of my process satisfactory yields of acetyl benzoyl peroxide are consistently obtained whether extremely pure or technical grades of raw materials are used. In all cases, the yields secured by the use of this process are much higher than could be obtained under the best of conditions using previously known methods. Also, less time is required to complete the reaction in the case of the new process, and smaller excesses of acetic anhydride are necessary for the reaction.

One method of carrying out this invention may be as follows:

The mixture of benzaldehyde and acetic anhydride may be placed in a glass or aluminum tube to provide a column of liquid. Air or oxygen may then be admitted into the bottom of the tube through a ceramic diffuser, and passed up through the column of liquid. It is desirable to control the temperature of the reaction mixture so that it does not rise above about 40° C., and a temperature of about 35° C., is preferred. Samples from the mixture may be analyzed at intervals, and the reaction is stopped when there is no further increase in the amount of acetyl benzoyl peroxide formed. The product may be recovered by chilling the reaction mixture until the acetyl benzoyl peroxide is crystallized. The crystals are then filtered from the liquid under pressure.

Specifically, reactions were conducted in the system described above using an aluminum tube provided with a water jacket to effect temperature control of the reaction.

The results of six representative runs are shown below in tabular form. In four of these reactions the best practice according to the previously known process is illustrated, while in direct comparison therewith are shown the data from two runs made in accordance with this invention.

dibenzoyl peroxide at a temperature below about 40° C.

| Run No. | 1 | 2 | 3 | 4 | 5 | 6 |
|---|---|---|---|---|---|---|
| Benzaldehyde, wt. parts | 400 | 403 | 475 | 400 | 400 | 585 |
| Acetic anhydride wt. parts | 1,001 | 1,014 | 1,150 | 1,000 | 1,080 | 840 |
| Molar ratio benzaldehyde/anhydride | 1:2.6 | 1:2.6 | 1:2.5 | 1:2.6 | 1:2.8 | 1:1.5 |
| Dibenzoyl peroxide, wt. parts | None. | None. | None. | None. | 10 | 10 |
| Dibenzoyl peroxide, percent total charge | | | | | 0.68 | 0.66 |
| Source of oxygen | Air. | Air. | Air.* | Pure oxygen. | Air. | Air. |
| Reaction temperature, °C | 35 | 35 | 35 | 35 | 35 | 35 |
| Duration reaction, hrs | 12.5 | 6.75 | 21.5 | 24 | 18.5 | 23.5 |
| Crude reaction product, wt. parts | 1,401 | 1,417 | 1,625 | 1,400 | 1,371 | 1,426 |
| Percent acetyl benzoyl peroxide in crude product | 21.5 | 17.2 | 22.2 | 20.4 | 44.3 | 62.5 |
| Percent yield of acetyl benzoyl peroxide (based on benzaldehyde) | 44.5 | 35.7 | 44.8 | 42.2 | 89.4 | 89.7 |

\* Air in this run was dried by passing through calcium chloride towers.

It will be readily apparent from these data that this invention has provided very material improvements in the process of making acetyl benzoyl peroxide. Modifications of this process are possible without departing from the invention, and are included within its scope as defined by the appended claims.

I claim:

1. Process for making acetyl benzoyl peroxide which comprises reacting upon benzaldehyde and acetic anhydrided with an oxygen-containing gas in the presence of dibenzoyl peroxide.

2. Process for making acetyl benzoyl peroxide which comprises reacting upon benzaldehyde and acetic anhydride with an oxygen-containing gas in the presence of about 0.25% to about 1.0% of dibenzoyl peroxide.

3. Process for making acetyl benzoyl peroxide which comprises reacting upon benzaldehyde and acetic anhydride with an oxygen-containing gas in the presence of about 0.25% to about 1.0% of dibenzoyl peroxide at a temperature below about 40° C.

4. Process for making acetyl benzoyl peroxide which comprises passing air through a mixture of benzaldehyde and acetic anhydride which contains a small amount of dibenzoyl peroxide, and thereafter separating acetyl benzoyl peroxide from said mixture.

5. Process for making acetyl benzoyl peroxide which comprises passing air through a mixture of benzaldehyde and acetic anhydride which contains from about 0.25% to 1.0% of dibenzoyl peroxide, and thereafter separating acetyl benzoyl peroxide from said mixture.

6. Process for making acetyl benzoyl peroxide which comprises passing air through a mixture of benzaldehyde together with a molar excess of acetic anhydride, said mixture containing about 0.66% of dibenzoyl peroxide and being maintained at a temperature of about 35° C.

THOMAS F. CARRUTHERS.